W. F. JACOBS.
HAY CARRIER.
APPLICATION FILED JULY 8, 1912.
1,106,512.
Patented Aug. 11, 1914.
3 SHEETS—SHEET 2.
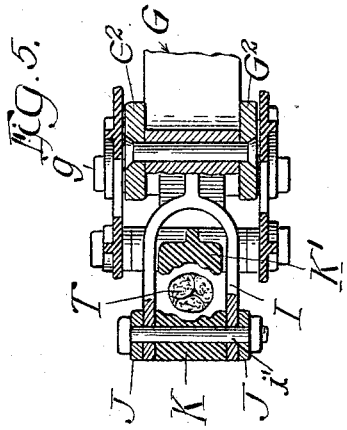
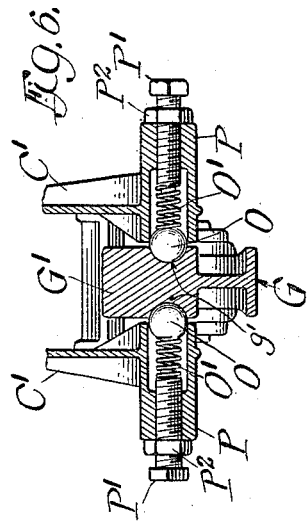
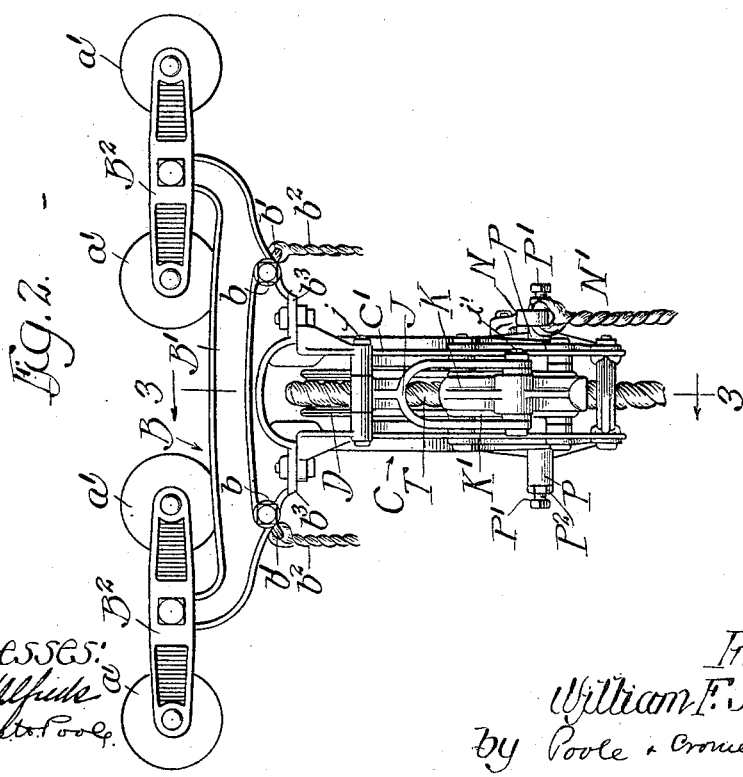

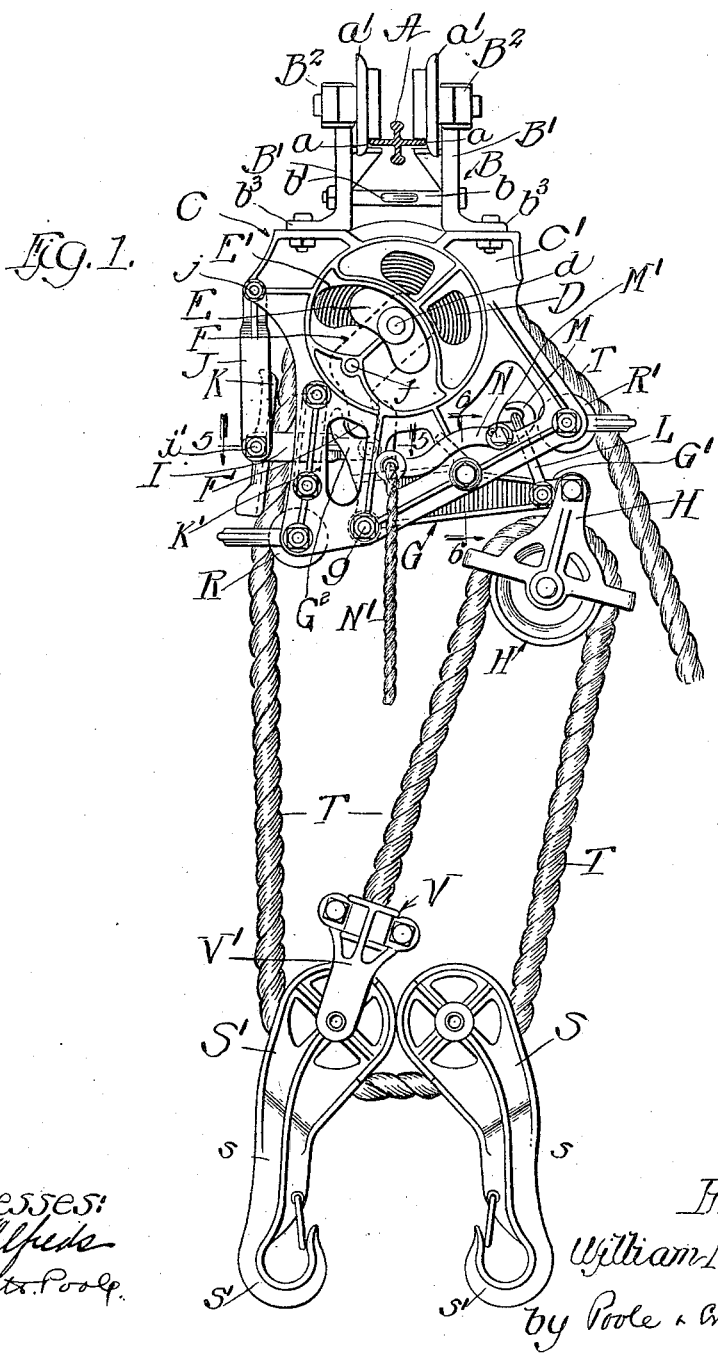

W. F. JACOBS.
HAY CARRIER.
APPLICATION FILED JULY 8, 1912.
1,106,512.
Patented Aug. 11, 1914.
3 SHEETS—SHEET 3.
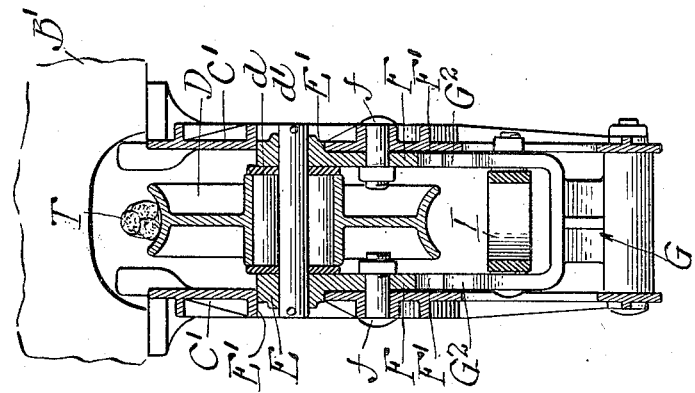
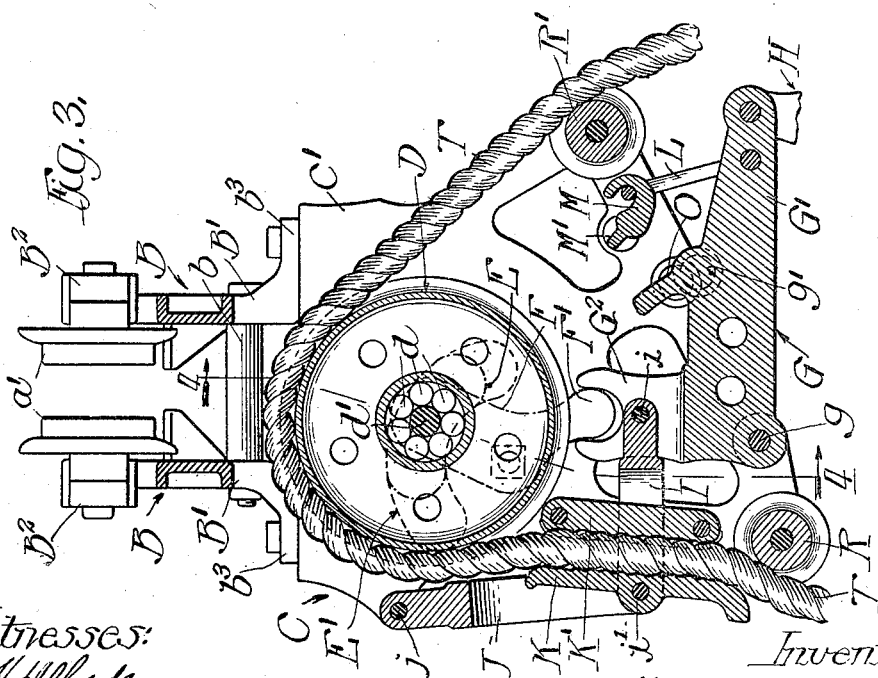

UNITED STATES PATENT OFFICE.

WILLIAM F. JACOBS, OF OTTAWA, ILLINOIS, ASSIGNOR TO J. E. PORTER COMPANY, OF OTTAWA, ILLINOIS, A CORPORATION OF ILLINOIS.

HAY-CARRIER.

1,106,512.  Specification of Letters Patent.  Patented Aug. 11, 1914.

Application filed July 8, 1912. Serial No. 708,152.

*To all whom it may concern:*

Be it known that I, WILLIAM F. JACOBS, a citizen of the United States, and a resident of Ottawa, in the county of La Salle and State of Illinois, have invented certain new and useful Improvements in Hay-Carriers; and I do hereby declare that the following is a full, clear, and exact description thereof, reference being had to the accompanying drawings, and to the letters of reference marked thereon, which form a part of this specification.

This invention relates to improvements in hay carriers of that kind known as cross-draft hay carriers, wherein the hay sling is suspended from an overhead track and is raised or lowered in loading or unloading and is transported from one place to another by the movement of the carrier along the track.

The invention relates particularly to an improved locking mechanism by means of which the draft rope may be clamped or held from movement or released in any position of the load.

The invention consists in the matters hereinafter described and more particularly pointed out in the appended claims.

In the drawings—Figure 1 is a view in side elevation, showing the carrier mounted upon a track; Fig. 2 is a view in front elevation of the hay carrier with the hay sling supporting pulleys removed; Fig. 3 is an enlarged cross-sectional view taken on line 3—3 of Fig. 2: Fig. 4 is a cross-sectional view taken on line 4—4 of Fig. 3; Fig. 5 is an enlarged cross-sectional view taken on line 5—5 of Fig. 1; Fig. 6 is an enlarged cross-sectional view taken on line 6—6 of Fig. 1.

Referring to the drawings, an overhead track A, provided with laterally extending tread flanges $a$, $a$ (Fig. 1), supports the hay carrier. The frame of the carrier proper comprises, as its main parts, a truck B and a supporting frame C attached to and depending from said truck B. The truck comprises two truck frame members B' rigidly connected together by means of horizontal, transverse, stay-bolts $b$. Both ends of each of said truck frame members B' terminate in upwardly extending arms (Fig. 2) with which are pivotally connected the wheel bearing members B², the latter being provided at their extremities with wheels $a'$ mounted on inwardly extending axles. The stay-bolts $b$, $b$ are provided with eyes $b'$, $b'$ to which are attached ropes $b^2$, $b^2$ by which the carrier may be pulled along the track. Said truck frame members are also provided with outwardly extending horizontal lugs $b^3$ to which are bolted parallel vertically arranged side frame members C¹ of the supporting frame C. Said side frame members C¹ are rigidly held in parallel relation and at a distance from each other by stay-bolts extending through said side frame members at convenient points. Between said side frame members C¹ is located a large pulley or rope sheave D (Fig. 3) supported through the medium of roller bearings $d$ upon an axle $d'$. Said axle extends through said side frame members C¹ and its extremities are loosely confined in segmental bearing plates E (Fig. 1). Said bearing plates E have curved bearing edges corresponding with the quadrants of concentric circles and are adapted to engage and slide endwise in slots in the side frames C', said slots being of similar shape but of larger arc, thus permitting the pulley or sheave D to have a limited swinging or oscillatory movement, through an arc corresponding with the extent of travel of said bearing plates E within the slots E'. Integral with said bearing plates E are arms F (Figs. 3 and 4); said arms being located at the inner surfaces of the side frames C¹ and pivoted to the latter by pivot bolts, the latter being at the center of the oscillating movement of the sheave D relative to the frame C. The arms F are provided with angularly extending fingers F¹ having rounded extremities.

Pivoted between the side frames C¹ on a bolt $g$ is a bell-crank lever G, the same having a horizontally extending longer arm G¹ and two shorter arms G² extending upward from the pivot bolt $g$. Said shorter arms G² are parallel and are adapted to engage the rounded end of the finger F¹ by means of semi-circular slots at the extremities of said arms. With the extremity of the longer arm G¹ of the rocking lever G is pivotally connected the frame of a smaller sheave H, which depends from said arm. Pivotally mounted between the shorter arms G² of the lever G, by a pivot bolt $i$, adjacent to the extremities thereof, is a U-shaped link member I, extending horizontally outward from said pivot bolt. A second U-shaped link member J is mounted on a pivot $j$, between the side frames $C^1$ at the upper portions of the same, said link member extending downward from said pivot $j$. Said link members I and J are loosely connected by means of a pivot pin $i^1$, on which is also mounted, between the legs of the U-shaped link members, a movable jaw member K preferably having its inner surface grooved transversely of its length. A fixed jaw member $K^1$ is rigidly mounted between the side frames $C^1$ inside of and generally parallel with the movable jaw member K. Said stationary jaw member is also provided with a grooved gripping surface facing the like surface of the movable jaw member K. Near the outer extremity of the longer arm $G^1$ of the rocking lever a U-shaped link L is pivotally connected at its lower end, with said lever. Said link L engages at its upper end a hook M which is attached to and preferably made integral with a rock shaft $M^1$. Said rock shafts extends between the side frames $C^1$, and has bearing at its ends in the latter. One extremity of said rock shaft $M^1$ extends beyond one of the side frames, and to the projecting end of said rock shaft is rigidly secured a lever N, to the outer end of which is connected a trip operating rope $N^1$.

Midway of the length of the longer arm $G^1$ of the bell-crank lever G, two semi-spherical depressions $g'$ (Fig. 6) are formed in said arm, the same being located on opposite sides of said arm. Said depressions are adapted to receive steel ball plungers O (Fig. 6) held within casings P, P that extend laterally from the side frames $C^1$. Said ball plungers O, O are constantly forced toward the lever arm $G^1$ by means of expansively acting, coiled springs $O^1$, $O^1$. Set screws $P^1$, $P^1$, are inserted through the outer ends of the casings P, and bear at their inner ends against the springs $O^1$. By means of said set screws the tension of said springs may be regulated. Lock nuts $P^2$, $P^2$ are provided to hold said set screws in desired position. The function of the ball plungers is to yieldingly hold the bell crank lever G in its normal position or with its horizontal arm elevated and the clamping jaws disengaged from the draft rope, and they act to prevent undesired movement of said lever under the weight of the slings and sheaves S, S', or otherwise than by the weight of the load. Guide pulleys R, R' (Figs. 1 and 3) are mounted between the side frames $C^1$ at the lower and lateral extremities of the frame C; the guide pulley R being located between the gripping jaws K and $K^1$ and the guide pulley R' above the sheave $H^1$. The sheaves S S' are provided with pulley wheels, adapted to be engaged by the draft rope T, and with downwardly extending arms $s$, $s$ terminating in hooks $s'$, $s'$, said hooks being adapted to engage the ends of the slings which surround the hay or like material to be elevated or carried.

The draft rope T is permanently attached to the pulley S', by means of a metal head V which is provided with arms V' adapted to straddle the sheave S' and to be attached to the extremities of the pulley axle. The draft rope T extending upward from the metal head V takes the following direction; it first passes through and engages the pulley of the sheave H, then extends downward through the sheaves S and S', then up over the guide pulley R, between the jaws K and K'; then up around the upper part of the large sheave D, then downward over the guide pulley R' and thence to the place at which power is applied thereto for operating the carrier.

From the above description of the construction of the device, the operation of the same will be readily understood. Assuming that the members are in the position shown in Fig. 1, and that a quantity of hay is about to be lifted and transported; the load is lifted by exerting a force upon the free end of the draft rope. As long as this force is exerted the rope will pass freely over the pulleys because the large sheave D is at this time held in the extreme position to which it is carried in the direction of the force exerted on the rope, that is to say, at the limit of its swinging movement in the direction of the draft on the rope. At the instant the lifting force ceases, the weight of the load is immediately transferred from the sheave D to the sheave H. The action of the weight immediately overcomes the resistance of the ball plungers and the arm $G^1$ of the bell-crank G drops downward a short distance. Likewise the shorter arms $G^2$ are given a movement about their pivot whereupon two distinct operations take place, namely, the large sheave D is moved about the pivot $f$ by the lever action of the fingers $G^2$ and the arm F, which carries the bearing plates E to the upper ends of the slots E'; secondly, the links I and J will be moved with the shorter arms $G^2$, causing the movable jaw K to approach the stationary jaw K'. This movement is sufficient to grip the rope tightly between the jaws, until released. To release the jaws, in order that the load may be lowered, the trip mechanism is used. By pulling on the rope $N^1$, attached to the lever N, the rock shaft M' is rotated sufficiently to cause the longer arm $G^1$ to be drawn upward to its original position, as in Fig. 1. By the same means as before described, the sheave is returned to its original position and the jaws K and K' are separated, thus releasing their hold upon the rope T. The load may now be lowered and removed from the carrier, which will then be in condition for the repetition of the operation. In case the load is removed when the carrier is in its locked condition, a pull or jerk on the draft rope will unlock the rope; it being evident that the main sheave will be thereby carried back to its original position, which movement will operate the links controlling the locking jaws.

An apparatus embodying my invention may be variously modified with respect to its details of construction without departure from the spirit of the invention, and I do not, therefore, desire to be limited to any of the particular features of construction illustrated in the accompanying drawings and hereinbefore described, except as pointed out in the appended claims.

I claim as my invention:

1. In a hay carrier, the combination of a supporting frame, a main sheave movably mounted in said frame, a pair of opposing jaws, one of which is movable, a bell crank lever pivotally mounted in said frame and having operative connection with said sheave and said movable jaw, a draft rope passing over said main sheave, downwardly between said jaws and connected to the extremity of said bell crank lever, the said rope being arranged to support the load between the sheave and the lever, a manually operable rock-shaft pivotally mounted upon said supporting frame, and provided with a hooked arm and a lever arm, to which is attached a hand rope, a link connecting said hooked arm to the extremity of said bell-crank lever, said rock-shaft being adapted to actuate the lever upwardly to release the jaws when the load is upon the elevating rope, and means for retaining the lever in its jaw-releasing position, comprising laterally movable ball plungers retained within casings integral with the supporting frame, and engaging semi-spherical depressions within the lever and springs within the casings arranged to force said ball plungers into engagement with said depressions.

2. In a hay carrier, the combination of a supporting frame, a main sheave movably mounted in said frame, a pair of opposing jaws, one of which is movable, a lever pivotally mounted in the supporting frame and having operative connection with the main sheave and with the said movable jaw, means acting to yieldingly retain said lever in its normal position, comprising semi-spherical depressions in the sides of said lever, ball plungers mounted in the frame and arranged to engage said depressions, and springs arranged to force said ball plungers against the lever.

3. In a hay carrier, the combination of a supporting frame having parallel, vertical side plates, a main sheave movably mounted in said frame, a pair of opposing jaws, one of which is movable, a lever pivoted between the side plates of the supporting frame and having operative connection with the main sheave and with the said movable jaw, said lever being provided with semi-spherical depressions, laterally movable ball plungers arranged to engage said depressions, and springs arranged to force said plungers against the arm, said side plates being provided with casings, within which are located said ball plungers and springs.

4. In a hay carrier, the combination of a supporting frame, having parallel, vertical side plates, a main sheave movably mounted in said frame, a pair of opposing jaws, one of which is movable, a lever pivoted between the side plates of the supporting frame and having operative connection with the main sheave and with the said movable jaw, said lever being provided with semi-spherical depressions, laterally movable ball plungers arranged to engage said depressions, springs arranged to force said plunger against the arm, said side plates being provided with casings, within which are located said ball plungers and springs, and set screws inserted through the outer ends of said casings and bearing on the outer ends of the said springs for varying the tension of the same.

In testimony, that I, claim the foregoing as my invention I affix my signature in the presence of two witnesses, this 2nd day of July A. D. 1912.

WILLIAM F. JACOBS.

Witnesses:
GLENN SHULER,
EDW. J. STOLTE.

---

Copies of this patent may be obtained for five cents each, by addressing the "Commissioner of Patents, Washington, D. C."